United States Patent [19]

Takeda

[11] Patent Number: 4,968,292

[45] Date of Patent: Nov. 6, 1990

[54] DRIVING FORCE TRANSMISSION DEVICE IN CORRUGATED CARDBOARD BOX MAKING MACHINE

[75] Inventor: Junichi Takeda, Hakui, Japan

[73] Assignee: Kabushiki Kaisha Ishikawa Seisakusho, Ltd., Kanazawa, Japan

[21] Appl. No.: 367,744

[22] Filed: Jun. 19, 1989

[30] Foreign Application Priority Data

Mar. 29, 1989 [JP] Japan ................................. 1-80145

[51] Int. Cl.⁵ .......................... B31B 1/74; B31B 49/02
[52] U.S. Cl. ................................. 493/477; 493/60; 493/324; 493/362; 493/480; 403/359; 464/158
[58] Field of Search .............. 493/54, 60, 324, 362, 493/477, 478, 479, 480; 403/359; 464/158

[56] References Cited

U.S. PATENT DOCUMENTS

| | | | |
|---|---|---|---|
| 2,457,942 | 1/1949 | Van Zandt | 403/359 |
| 2,525,695 | 10/1950 | Lombard | 464/158 |
| 3,287,031 | 11/1966 | Simmons et al. | 403/359 |
| 3,541,871 | 11/1970 | Burrell | 403/359 |
| 4,601,182 | 7/1986 | Glanzmann | 403/359 |
| 4,828,422 | 5/1989 | Anthony et al. | 403/359 |

FOREIGN PATENT DOCUMENTS 62-191131 8/1987 Japan .

*Primary Examiner*—William E. Terrell
*Attorney, Agent, or Firm*—Burns, Doane, Swecker & Mathis

[57] ABSTRACT

A corrugated cardboard box making machine wherein the units such as feed unit, printing unit and slotting unit are separably connected in alignment with a driving shaft being provided on each one of the units, and on an external gear which is one element of a coupling arranged between the driving shafts engaging projections are provided and on an internal gear which is the other element, there are provided engaging concave portions to automatically receive the engaging projections only when rotational positions of both of the gears are coincided. The machine is further arranged to automatically and accurately perform smooth connecting operation of each driving shaft when each unit is reconnected after such work as printing plate exchange is finished.

9 Claims, 6 Drawing Sheets

FIG.12
PRIOR ART

DRIVING FORCE TRANSMISSION DEVICE IN CORRUGATED CARDBOARD BOX MAKING MACHINE

BACKGROUND OF THE INVENTION

1. Field of the Invention

The present invention relates to a driving force transmission device provided between the units in a corrugated cardboard box making machine.

2. Description of Related Art

In a corrugated cardboard box making machine, a feed unit, a printing unit and a slotting unit are connected in alignment and they are driven in a state of synchronization with a driving source.

Maintenance procedures such as exchange and cleaning of printing plates in the printing unit and exchange of slotting knives in the slotting unit are frequently carried out. In order to readily carry out such procedures, each unit is arranged to move on a box making line and to separate from one another.

Figure 12:
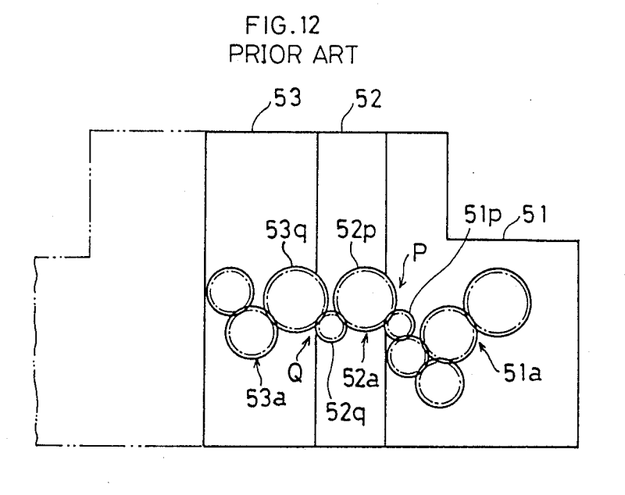
FIG. 12 is a diagrammatic front view theoretically showing a driving force transmission device provided between units in a prior art.

FIG. 12 shows a driving system in a feed unit 51, a printing unit 52 and a slotting unit 53 of a conventional corrugated cardboard box making machine. Each one of the units 51,52,53 is provided with a gear transmission 51a,52a,53a comprised of a spur gear train.

The feed unit 51 is provided with a driving motor to rotate the gear transmission 51a for driving a movable member such as transport mechanism in the feed unit 51. A driving force is transmitted from a gear 51p in the feed unit 51 to a gear 52p in the printing unit 2 to rotate the gear transmission 52a in the printing unit 52 thereby driving movable members such as a printing cylinder in the printing unit 52.

A driving force is transmitted from a gear 52q in the printing unit 2 to a gear 53q in the slotting unit 53 to rotate the gear transmission 53a in the slotting unit 53 thereby driving movable members such as a slotter shaft in the slotting unit 53. In such a manner, each one of the gear transmissions 51a,52a,53a is simultaneously rotated, and printing drum, slotter shaft and the like are operated at a predetermined timing.

The procedures of changing printing plates, slotting knives, etc. are carried out so that each unit 51,52,53 is separated, and during the procedures, the printing cylinder and the slotter shaft are rotated independently. Accordingly, after the procedures, if each unit 51,52,53 is again connected without making any arrangement, the operation timing of each unit 51,52,53 is disturbed. In other words, when the box making machine is operated after each unit is connected again, the printing position does not coincide with the position initially set in the printing unit 52, while the slotting position does not coincide with the position initially set in the slotting unit 53 since the state of engagement of gears at the positions P, Q shown in FIG. 12 is changed from that of the original state. In order avoid these inconveniences, each unit 51,52,53 has to be reconnected so as to coincide with the original state by engaging the gears 51p,52p,52q and 53q positioned at P, Q shown in FIG. 12.

Heretofore, it has been practiced to put a mark on the gears 51p,52p which engage with each other at the position shown by P to indicate initially set positions before each unit 51,52,53 is separated, and likewise, the gears 52q,53q which engage with each other at the position shown by Q were marked to indicate initially set positions in order to solve the above-mentioned problems. According to this method, when each unit 51,52,53 is reconnected after some necessary maintenance procedures in a manner to engage the marks coincide with the gears 51p,52p,52q,53q, the box making machine after it is reconnected can be operated with proper operation timing.

However, in order to have the marks of the gears 51p,52p,52q,53q coincide with each other, the printing drum in the printing unit 2 and the gear transmission 52a, for instance, have to be rotated manually by overcoming the inertia the printing drum and the gear transmission possess which requires operator a great effort of the in the conventional method. At the same time, it requires the operator to pay strict attention to the work of marking before each unit 51,52,53 is separated and also to the work of causing the marks coincide with each other when the units are reconnected. In addition to the problems inherent in the conventional method as above-mentioned, there is also a problem that when each unit 51,52,53 is separated, the oil on the gears 52p,53q drop to the nearby floor and stain the floor since the gears 52p,53q are extruded outwardly from the connected surfaces of the units.

In order to cope with the problem, there is a device disclosed in the Japanese Patent Application TOKKAI SHO 62-191131. In the device, a driving shaft is provided on each one of units for driving movable members of the unit, and the driving shafts are arranged movable toward and away from each unit to be connected by a coupling. However, according to this prior art, there was a difficulty in making smooth connection between the driving shafts since frictional resistance is too large when they are connected. Moreover, the durability of the coupling is not sufficient and it is unable to provide the arrangement for practical use.

SUMMARY OF THE INVENTION

An object of the present invention is to provide a device capable of smoothly carrying out a series of operations in which various operations are performed upon separating each unit, and thereafter, the units are connected again.

Another object of the present invention is to provide a device wherein a driving shaft of each unit is automatically connected with proper operation timing when each unit is reconnected so that attentiveness and labor required of the operator can be considerably reduced.

A further object of the present invention is to provide a device capable of solving the problem of the prior art which stains permits of the floor by oil when each unit is separated.

A still further object of the present invention is to provide a device provided with superior durability and capable of making smooth connection between each one of the driving shafts.

In order to accomplish the above-stated objects, the present invention comprises a plurality of units such as a feed unit, a printing unit and a slotting unit, and a driving force transmission device arranged between each unit in a corrugated cardboard box making machine in which each one of said units is separably connected in alignment. The arrangement includes a driving shaft provided on each unit along the feeding direction of a corrugated cardboard sheet for driving movable members of each unit and a driving source provided on any one of the units for driving a driving shaft of the unit. A coupling is provided by an external gear attached to an edge of a driving shaft provided on either one of the units to be connected and an internal gear attached to an edge of the other driving shaft. At least one of the external or internal gears toward the other gear in the direction of shaft so that when each unit is connected, the external gear and the internal gear are connected to transmit a driving force from one of the driving shafts to the other driving shaft. A plurality of engaging projections are provided on the outer circumference of the external gear and have a predetermined width in the circumferential direction. The engaging projections are further provided with portions projecting from an edge of the external gear toward the internal gear and extending in the axial direction. The plurality of engaging projections are arranged with irregular spaces in the circumferential direction, and a plurality of engaging concave portions are provided on the inner circumference of the internal gear for engaging with each one of the engaging projections.

The engaging projections and the engaging concave portions are constructed in a manner wherein a plurality of the engaging projections are provided on the outer circumference of the external gear and project from an edge of the external gear toward the internal gear side in the axial direction. The plurality of the engaging projections are arranged with unequal widths in the circumferential direction, and a plurality of engaging concave portions provided on the inner circumference of the internal gear for engaging with each one of the engaging portions.

The present invention is so arranged that when each unit is reconnected, the external gear and the internal gear which comprise the coupling simultaneously come in contact with each other in an unengaged state. At this stage, the adjoining units are properly connected in close contact with each other at their connected surfaces since at least one of the gears is proved in the direction of shaft resisting the energized force.

The connection between the driving shafts is automatically carried out by rotating the driving shaft on the driving side. In other words, the gear on the driving side of the coupling is also rotated by rotation of the driving shaft on the driving side, and when the gear on the driving side is rotated to the position where it corresponds with the position of rotation of the gear on the driven side, the engaging projections of one of the external gears are received by the engaging concave portions of the internal gears thus making the coupling connected state. The engagement of the engaging projections with the engaging concave portions is automatically carried out since at least one of the gears is urged toward the other gear.

When the coupling is connected in a manner as described above, the operation timing between the driving shafts completely coincides with each other and each unit is operated in a state of synchronization. It thus becomes not necessary, according to the present invention, to perform such maintenance procedures as marking and mark fitting operations which were required in the prior art. Furthermore, the work which requires labor for manually rotating the driving systems of each unit for the mark fitting operation becomes no longer necessary. Thus, reconnecting operation of each unit can be smoothly carried out.

In the present invention, the problem of staining the nearby floor by oil can also be solved since the invention does not adopt the construction in which a part of the gears is projected outwardly from the connecting surfaces of each unit when the units are separated as in the prior art.

According to the present invention, the external gear and the internal gear come into contact with each other at a plurality of locations in a state of point contact before they are connected, and the points of contact are made at locations away from each axial cores of the gears. Accordingly, the rotating torque necessary for rotating either one of the gears to connect both gears is very small compared with the case when both gears are in contact with each other all over the surfaces. Consequently, the repeated stress which affects both gears becomes small and the durability can be increased.

Furthermore, frictional resistance is comparatively small and the gears are smoothly connected since each of the protrusions is engaged into each of the engaging concave portions under a state of line contact when the connection of both of the gears is firstly made between the protrusions of the engaging projections and the engaging concave portions.

These and other objects and features of the present invention will become more apparent from the following description taken in conjunction with the preferred embodiments thereof with reference to the accompanying drawings.

DESCRIPTION OF THE PREFERRED EMBODIMENTS

Some of the embodiments of the present invention will now be described with reference to accompanying drawings.

Figure 1:
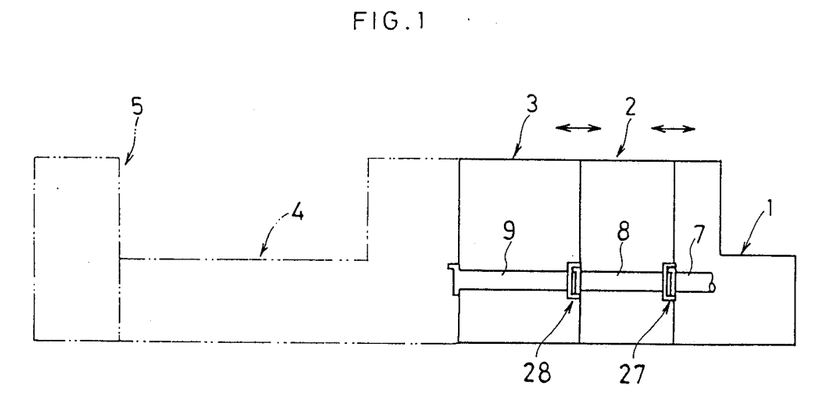
FIG. 1 is a diagrammatic front view theoretically showing a driving force transmission device provided between units in an embodiment of the present invention.

FIG. 1 theoretically shows an example of a corrugated cardboard box making machine to which the present invention is applied.

The corrugated cardboard box making machine comprises a feed unit 1, a printing unit 2, a slotting unit 3, a folding unit 4 and a delivery unit 5, and said units are sequentially connected in this order in alignment.

The corrugated cardboard sheets 6 (refer to FIG. 8) piled up on the feed unit 1 are fed one by one to the printing unit 2 and a predetermined printing process is performed thereat. Then, the corrugated cardboard sheet 6 is forwarded to the slotting unit 3 wherein slotting and creasing operations are conducted. Thereafter, the corrugated cardboard sheet 6 is transported to the folding unit 4 where the sheet is bent along the folding lines and folded not to be bulky. The corrugated cardboard box thus formed is then forwarded to the delivery unit 5 to be stored therein and is carried out therefrom.

Figure 2:
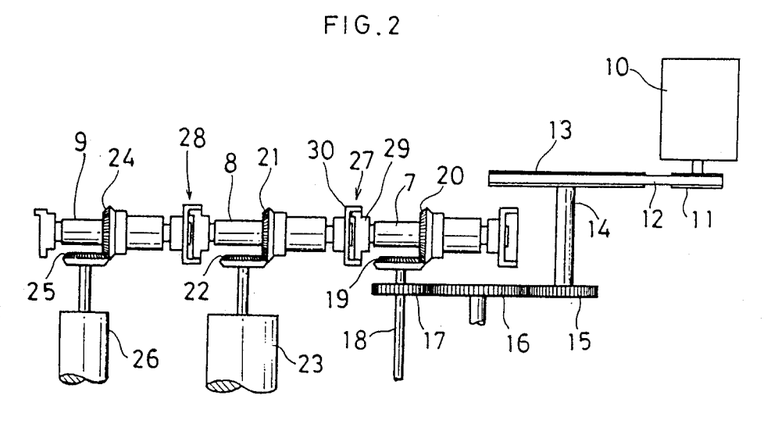
FIG. 2 is a plan view of the driving force transmission device.

The feed unit 1, printing unit 2 and slotting unit 3 which constitute a front division of the corrugated cardboard box making machine are provided with driving shafts 7,8,9 on the sides for driving movable members of each unit. FIG. 2 shows the driving system.

The feed unit 1 is provided with an electric motor 10 which operates as a driving source for the driving system to drive the driving shaft 7.

The driving force of the electric motor 10 is transmitted to the driving shaft 7 in order of V pulley 11, V belt 12, V pulley 13, shaft 14, gear 15, idle gear 16, gear 17, kicker shaft 18, bevel gear 19 and bevel gear 20. The kicker shaft 18 is provided for operating a kicker which kicks out a corrugated cardboard sheet.

The driving force of the driving shaft 8 in the printing unit 2 is transmitted to a print cylinder 23 through bevel gear 21 and bevel gear 22 to rotate the print cylinder. The driving force of the driving shaft 9 in the slotting unit 3 is transmitted to a slotter shaft 26 through bevel gear 24 and bevel gear 25 to rotate the slotter shaft.

The driving shafts 7,8,9 of each unit 1,2,3 are arranged along the feeding direction of the corrugated cardboard sheet 6 and are connected through couplings 27,28. Each unit 1,2,3 is separably connected in alignment in the direction of arrow shown in FIG. 1. When each unit 1,2,3 is connected, the couplings 27,28 connect each driving shaft 7,8,9, and the driving shafts 7,8,9 are simultaneously rotated by the driving force of the electric motor 10. On the other hand, when each unit 1,2,3 is separated, the couplings 27,28 are separated, and each driving shaft 7,8,9 in a separated state.

The driving shafts 7,8,9 and the couplings 27,28 will now be specifically described referring to FIGS. 3 through 7.

Each driving shaft 7,8,9 and each coupling 27,28 are made in the same construction, and therefore, the driving shaft 8 in the printing unit 2 and the coupling 27 which is arranged between the driving shafts 7,8 in the feed unit 1 and the printing unit 2 will be representatively described below.

The coupling 27 comprises an external gear 29 (an element on the driving side of the coupling) attached to an edge of the driving shaft 7 of the feed unit 1 and an internal gear 30 (an element on the driven side of the coupling) attached to an edge of the driving shaft 8 of the printing unit 2.

Figure 4:
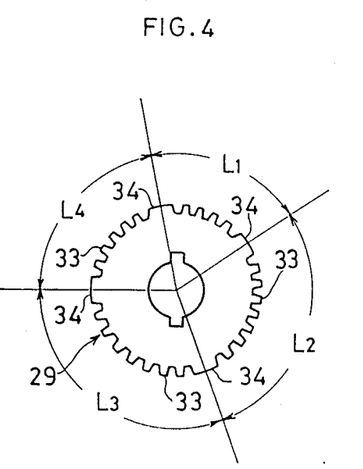
FIG. 4 is a front view of an external gear which is one of the elements of a coupling.

The external gear 29 is fixed on an edge of the driving shaft 7 with a connecting plate 31 and a bolt 32. On its circumference, external teeth 33 are formed for a spur gear, and engaging projections 34 which are larger in width of tooth than that of the external teeth 33 are formed in place of the external teeth 33 on a plurality of locations of the circumference. Particularly, as shown in FIG. 4, the external gear 29 has the engaging projections 34 at four locations. Each of the engaging projections 34 is formed on the outer circumference of the external gear 29 in a shape of a kind of tooth formed by two pieces of the external teeth 33 with the middle portion filled in.

As shown in FIG. 4, the engaging projections 34 are formed with spaces $L_1$, $L_2$, $L_3$ and $L_4$ in the direction of circumference. When it is illustrated, the spaces are in a correlations of $L_1 \neq L_2 = L_3 \neq L_4$. The engaging projections 34 may be arranged by way of other means than it is illustrated. However, it is a prerequisite to arrange a plurality of the engaging projections 34 provided with a predetermined width in the direction of circumference on the outer circumference of the external gear 29 in irregular spaces in the direction of circumference.

Figure 6:
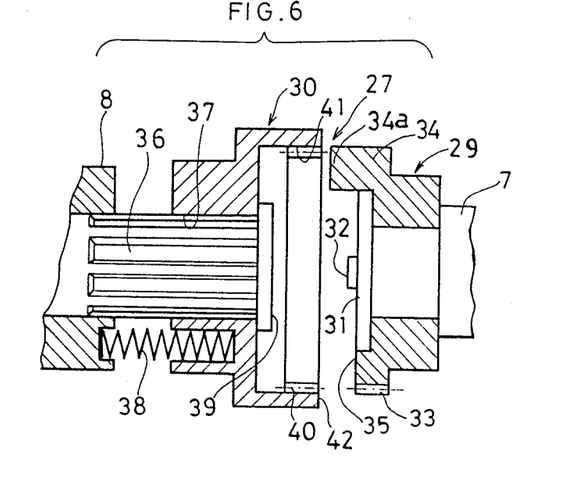
FIG. 6 is a cross-sectional view showing the coupling.
Figure 7:
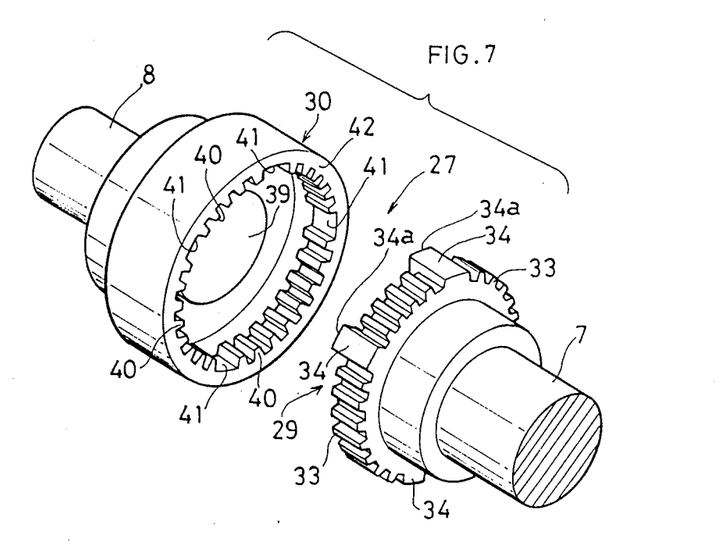
FIG. 7 is a perspective view illustrating the coupling.

The engaging projections 34 are also provided with protrusions 34a projecting toward the internal gear 30 in the axial direction from an edge surface 35 of the external gear 29 as shown in FIGS. 6 and 7. The protrusions 34a are provided for functioning as a guide when the external gear 29 and the internal gear 30 are connected together.

The internal gear 30 is movably attached to an edge of the driving shaft 8 in the axial direction, but not rotatable in correlation. The edge of the driving shaft 8 is, therefore, arranged as a spline shaft 36 and the internal gear 30 is provided with a spline internal gear 37 to engage therewith. The internal gear 30 is energized toward the external gear 29 by a compression spring 38.

Figure 5:
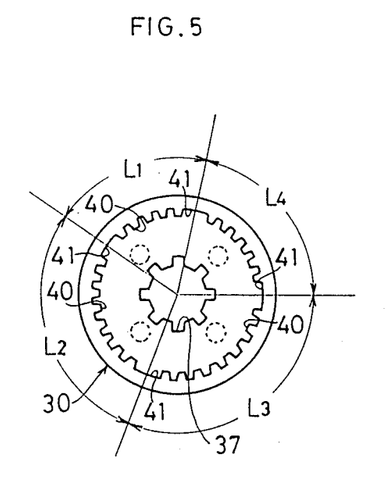
FIG. 5 is a front view of an internal gear which is one of the other elements of the coupling.

On an edge surface of the driving shaft 8, there is fixed a stopper plate 39 to regulate the movement of the internal gear 30 in the axial direction. On the inner circumference of the internal gear 30, internal teeth 40 for spur gear are formed to engage with the external teeth 33, while an engaging concave portions 41 are formed at a plurality of locations in the inner circumference to engage with the engaging projections 34 in place of the internal teeth 40. Particularly, as shown in FIG. 5, there are formed engaging concave portions 41 at four locations of the internal gear 30 which are in a symmetric positional relation with four locations of the engaging projections 34 of the external gear 29. The reference numeral 42 in FIGS. 6 and 7 designates an edge surface of the internal gear 30.

Figure 3:
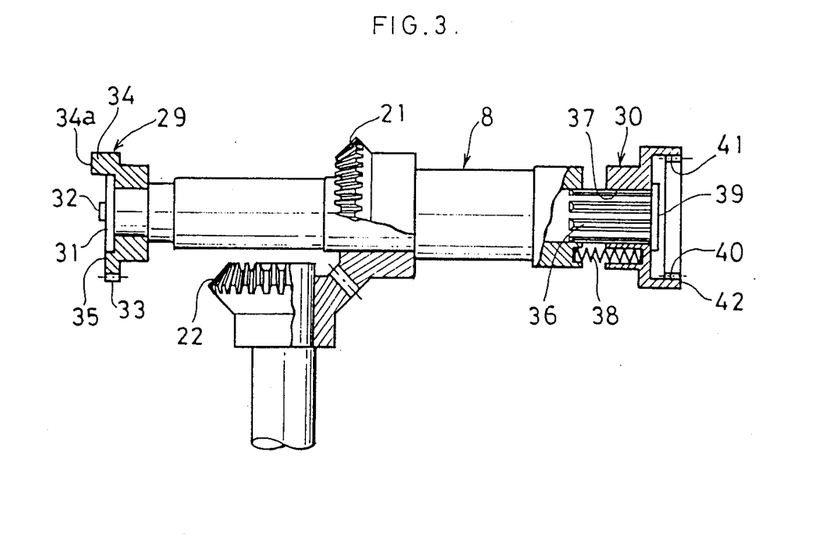
FIG. 3 is a plan view, with portions broken away to show main parts, of the driving force transmission device.

FIG. 3 shows the driving shaft 8 of the printing unit 2, to the right edge of which the internal gear 30 is attached, while to the left edge of which there is attached the external gear 29 which is the same as the one attached to the driving shaft 7.

The feed unit 1, printing unit 2 and slotting unit 3 shown in FIG. 1 are provided with their own oiling mechanism (not shown) with an independent oil path in each one of their driving systems, while being provided with independent oil sealing in order to prevent oil from moving at the connecting sections of the adjoining driving shafts when the units are connected.

Now, the description will be made on the action of the device by exemplifying the case when a printing plate is exchanged. The operation is described after the machine is stopped and the feed unit 1, printing unit 2 and slotting unit 3 are separated. And, the print cylinder 23 is properly rotated during the exchange operation of the printing plate. Consequently, the driving shaft 8 is also rotated by rotation of the print cylinder 23 before and after the operation, and rotating position is changed from the original state. When each unit 1,2,3 is reconnected after the exchange procedures of the printing plate, the couplings 27 and 28 are also connected automatically at a proper positional relation, which will be described by exemplifying the coupling 27 shown in FIG. 6.

When the feed unit 1 and the printing unit 2 are approached, protrusions (guide portion) 34a of a plurality of the engaging projections 34 in the external gear 29 firstly contact the edge surface 42 of the internal gear 30. When both of the units 1,2 are further approached more closer, the internal gear 30 is consequently pushed by the external gear 29 and is retreated on the spline shaft 36. When both units 1,2 are connected, the external gear 29 and the internal gear 30 come in contact with each other at the protrusions 34a and the edge surface 42, and elastically contact with each other due to being urged by the compression spring 38.

When an operation switch is turned on by operator under such condition, the electric motor 10 is driven and the driving shaft 7 is rotated. When the driving shaft 7 is rotated and moves to the position where the engaging projections 34 of the external gear 29 and the engaging concave portions 41 of the internal gear 30 coincide with each other, the internal gear 30 is moved forward by the energizing force of the compression spring 38, and the engaging projections 34 and the engaging concave portions 41 firstly engage with each other, and then the external teeth 33 and the internal teeth 40 are engaged with each other thus accomplishing the complete engagement. In such a manner, the coupling 27 is automatically engaged, and the driving shafts 7,8 of the feed unit 1 and the printing unit 2 are connected.

In the same manner, the coupling 28 is automatically engaged to connect the driving shafts 8,9 between the printing unit 2 and the slotting unit 3.

When the couplings 27,28 are composed of the external gear 29 and the internal gear 30 which are arranged as described above, the external gear 29 and the internal gear 30 come in contact with each other under a state of point contact (the contact of the protrusions 34a with the edge surface 42) at a plurality of locations before they are connected, with the locations of the point of contact away from each axial core of the gears 29,30. The rotary torque necessary for rotating either one of the external gear 29 or the internal gear 30 to connect both of them is, therefore, very small compared with the case when both gears 29,30 are in contact with each other on all over the surfaces. Accordingly, the repeated stress which affects both gears 29,30 is small and the life of the gears 29,30 can be prolonged.

Furthermore, frictional resistance is comparatively small and the gears 29,30 are smoothly connected since each of the protrusions 34a is engaged into each of the engaging concave portions 41 under a state of line contact when the connection of both of the gears 29,30 is firstly made between the protrusions 34a of the engaging projections 34 and the engaging concave portions 41. Thereafter, the engagement of the engaging projections 34 with the engaging concave portions 41 and the interlocking of the external teeth 33 with the internal teeth 40 are carried out to closely contact both of the gears 29,30.

Figure 8:
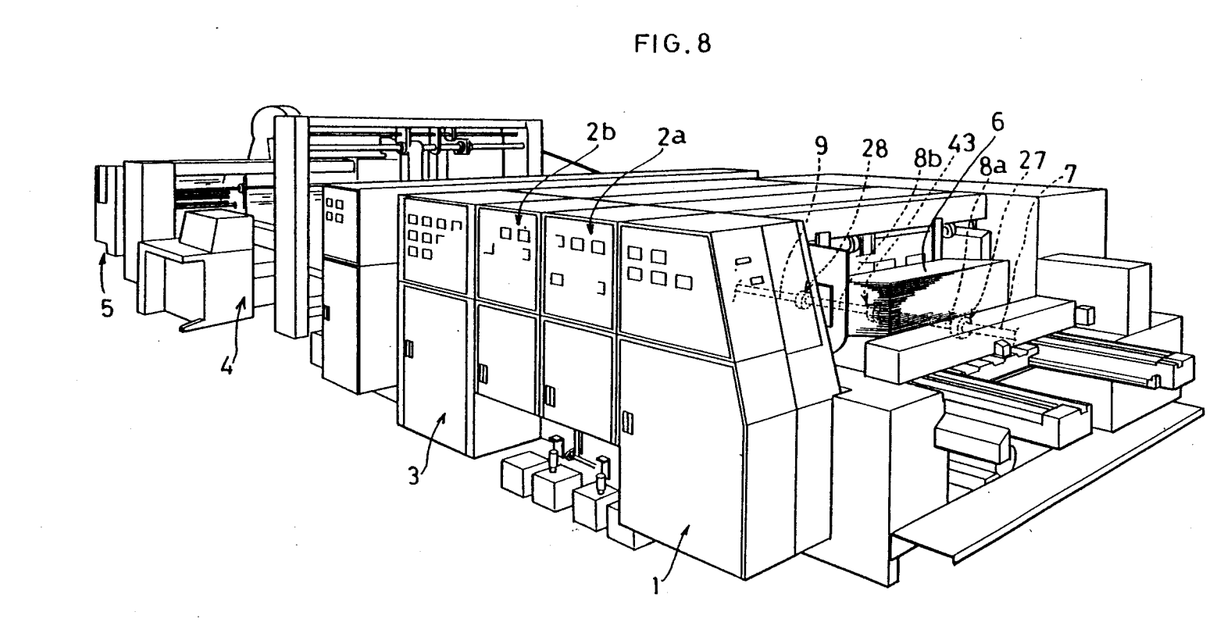
FIG. 8 is a perspective view showing an example of a concrete construction of a corrugated cardboard box making machine to which the present invention is applied.

FIG. 8 shows an example of practical construction of a corrugated cardboard box making machine to which the present invention is applied.

The corrugated cardboard box making machine comprises a printing section composed of a first printing unit 2a and a second printing unit 2b. Accordingly, the front division of the corrugated cardboard box making machine comprises four units 1,2a,2b and 3, and driving shafts 7,8a,8b,9 which are the same as the ones above-described are provided on each unit. The driving shafts 7,8a,8b,9 are connected with couplings 27,43,28 which are the same as the ones earlier described.

Figure 9:
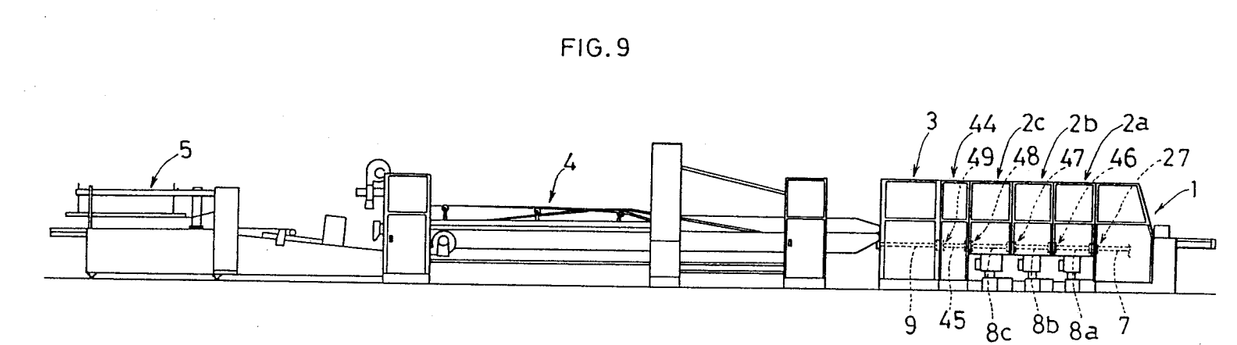
FIG. 9 is a front view showing another example of a corrugated cardboard box making machine to which the present invention is applied.

FIG. 9 shows a corrugated cardboard box making machine as another example of practical construction to which the present invention is applied.

The front division of the corrugated cardboard box making machine comprises six units of a feed unit 1, a first printing unit 2, a second printing unit 2b, a third printing unit 2c, a die cutter unit 44 and a slotting unit 3. Each one of the units is provided with driving shafts 7,8a,8b,8c,45,9 which are the same as the ones above-mentioned, and between each one of the driving shafts, there are provided couplings 27,46,47,48,49 which are the same as the ones earlier described.

The present invention may be changed and modified in various forms other than the embodiments described above. For instance, in place of the coupling 27 shown in FIGS. 6 and 7, a coupling which is not provided with external teeth 33 and internal teeth 40 may be employed.

Figure 10:
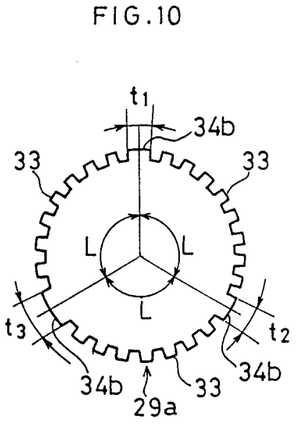
FIG. 10 is a front view showing an outer shape of one of the elements of a coupling in another embodiment of the present invention.

As shown in FIG. 10, a coupling may be composed of two gears by providing a plurality of engaging projections 34b on the outer circumference of external gear 29a at regular intervals 1 (120°) and setting unequal widths $t_1$, $t_2$, $t_3$ in the circumferential direction of the engaging projections 34b, while providing engaging concave portions to engage with each of the engaging projections 34b on the inner circumference of internal gear.

Figure 11:
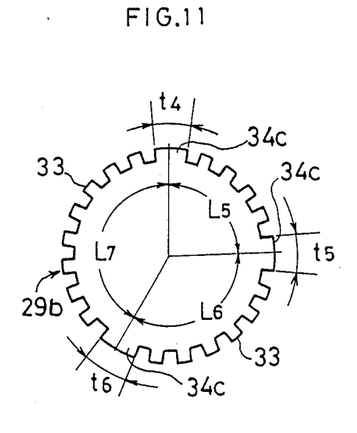
FIG. 11 is a front view showing an outer shape of one of the elements of a coupling in one of the other embodiments of the present invention.

Or, as shown in FIG. 11, a coupling may be composed of two gears by providing a plurality of engaging projections 34c at irregular intervals $L_5$, $L_6$, $L_7$ on the outer circumference of external gear 29b and setting unequal widths $t_4$, $t_5$, $t_6$ in the circumferential direction of the engaging projections 34c, while providing engaging concave portions to engage with each of the engaging projections 34c on the circumference of internal gear.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A driving force transmission device provided between units in a corrugated cardboard box making machine wherein a plurality of units including a feed unit, a printing unit and a slotting unit are separably connected in alignment, comprising:
    a driving shaft for driving movable members of each of the units and provided on each one of the units in a feeding direction of a corrugated cardboard sheet;
    a driving source for driving the driving shaft and provided on any one of the units;
    a coupling for transmitting a driving force from one of the driving shafts to the other driving shaft and comprising an external gear attached to an end of the driving shaft and an internal gear attached to an opposed end of the other driving shaft to be connected, and at least one of the external gear and the internal gear movably energized toward the other gear in the axial direction of the driving shaft;

a plurality of engaging projections provided with different distances to each other in a circumferential direction and provided as a substitute for teeth of the external gear and having a predetermined width in the circumferential direction and a predetermined height in a radial direction and projected portions projecting from the external gear to the internal gear; and, a plurality of engaging concave portions for engaging with each of said engaging projections of said external gear and provided as a substitute for teeth of the internal gear.

2. The driving force transmission device as defined in claim 1, wherein:

the teeth of the external gear being outer spur gear teeth, and the plurality of engaging projections as a substitute for said external teeth have a wider width than that of the outer teeth;

the teeth of the internal gear being inner spur gear teeth.

3. The driving force transmission device as defined in claim 1, wherein at least one of said external gear and said internal gear is splined to an end of the driving shaft and energized by compression spring.

4. The driving force transmission device as defined in claim 1, wherein each width of all engaging projections in the circumferential direction is the same.

5. The driving force transmission device as defined in claim 1, wherein each width of all said engaging projections in the circumferential direction is irregular.

6. A driving force transmission device provided between units in a corrugated cardboard box making machine wherein a plurality of units including a feed unit, a printing unit and a slotting unit are separably connected in alignment, comprising:

a driving shaft for driving movable members of each of the units and provided on each one of the units in a feeding direction of a corrugated cardboard sheet;

a driving source for driving the driving shaft and provided on any one of the units;

a coupling for transmitting a driving force from one of the driving shafts to the other driving shaft and comprising an external gear attached to an end of the driving shaft and an internal gear attached to an opposed end of the other driving shaft to be connected, and at least one of the external gear and the internal gear movably energized toward the other gear in the axial direction of the driving shaft;

a plurality of engaging projections provided as a substitute for a predetermined number of teeth of the external gear and having a different width to each other in the circumferential direction and a predetermined height in a radial direction and projected portions projecting from the external gear to the internal gear; and, a plurality of engaging concave portions for engaging with each one of said engaging projections of said external gear and provided as a substitute for a predetermined number of teeth of the internal gear.

7. The driving force transmission device as defined in claim 6, wherein:

the teeth of the external gear are outer spur gear teeth, and the plurality of engaging projections provided in place of some of the external teeth have a wider width than that of the outer teeth;

the teeth of the internal gear are inner spur gear teeth.

8. The driving force transmission device as defined in claim 6, wherein one of said external gear and said internal gear is splined to an end of the driving shaft and energized by a compression spring.

9. The driving force transmission device as defined in claim 6, wherein each of said engaging projections is arranged with uniform space in the circumferential direction.

* * * * *